United States Patent
Patel et al.

(10) Patent No.: US 10,454,754 B1
(45) Date of Patent: Oct. 22, 2019

(54) HYBRID CLUSTER RECOVERY TECHNIQUES

(71) Applicant: Amazon Technologies, Inc., Seattle, WA (US)

(72) Inventors: Parth Patel, Redmond, WA (US); Rachit Chawla, Kirkland, WA (US); Aseem Cheema, Mercer Island, WA (US); Antoun Joubran Kanawati, Seattle, WA (US); Manoj Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 15/382,340

(22) Filed: Dec. 16, 2016

(51) Int. Cl.
G06F 15/173 (2006.01)
H04L 12/24 (2006.01)
H04L 29/08 (2006.01)

(52) U.S. Cl.
CPC ...... H04L 41/0654 (2013.01); H04L 67/1095 (2013.01)

(58) Field of Classification Search
CPC .......................... H04L 41/0654; H04L 67/1095
USPC ................................. 709/201, 223, 224, 230
See application file for complete search history.

(56) References Cited

U.S. PATENT DOCUMENTS

| | | | |
|---|---|---|---|
| 6,363,416 B1 * | 3/2002 | Naeimi | H04L 12/66 709/209 |
| 7,269,648 B1 * | 9/2007 | Krishnan, Sr. | G06F 17/30575 707/E17.032 |
| 7,461,130 B1 * | 12/2008 | AbdelAziz | H04W 84/20 709/208 |
| 7,587,465 B1 * | 9/2009 | Muchow | G06F 9/5061 709/208 |
| 2010/0162036 A1 * | 6/2010 | Linden | G06F 11/181 714/4.11 |

OTHER PUBLICATIONS

U.S. Appl. No. 13/528,271, filed Jun. 20, 2012, Long X. Nguyen.
U.S. Appl. No. 14/489,451, filed Sep. 17, 2014, Chi Hai Ho.
"Amazon ElastiCache—API Reference", Amazon WebServices, API Version, Feb. 2, 2015, pp. 1-159.
"Amazon ElastiCache—User Guide", Amazon WebServices, API Version, Feb. 2, 2015, pp. 1-399.
Wikipedia, "Gossip protocol", Retrieved from URL: https://en.wikipedia.org/wiki/Gossip_protocol on Oct. 23, 2016, pp. 1-6.
"Redis Cluster Specification", Retrieved from URL: http://redis.io/topics/clusterspec on Oct. 23, 2016, pp. 1-42.
"Redis cluster tutorial", Retrieved from URL: http://redis.io/topics/clustertutorial on Oct. 23, 2016, pp. 1-30.

* cited by examiner

Primary Examiner — Liang Che A Wang
(74) Attorney, Agent, or Firm — Robert C. Kowert; Meyertons, Hood, Kivlin, Kowert & Goetzel, P.C.

(57) ABSTRACT

At a recovery manager associated with a cluster, a determination is made as to whether a replacement for a first node of the cluster can be elected by the other nodes of the cluster using a first election protocol. The recovery manager selects a second node of the cluster as a replacement for the first node, based on data item replication progress made at the node, and transmits an indication that the second node has been selected to one or more nodes of the cluster.

20 Claims, 9 Drawing Sheets

HYBRID CLUSTER RECOVERY TECHNIQUES

BACKGROUND

Numerous types of computer-based applications are run in distributed computing environments—e.g., using resources of various network-accessible services supported by cloud-based providers. In many cases, clusters comprising several cooperating nodes or servers may be set up for an application, with one or more of the nodes with special responsibilities within a cluster being designated as "master" nodes at a given point in time. A master node of a database cluster may, for example, be responsible for handling a different mix of client input/output (I/O) requests (such as writes as well as reads) than non-master nodes (which may be responsible for reads but not writes). For some applications, a master node may be required for a cluster to function correctly. Under certain types of failure conditions, selecting a master node for a cluster may present a non-trivial challenge.

Figure 1:
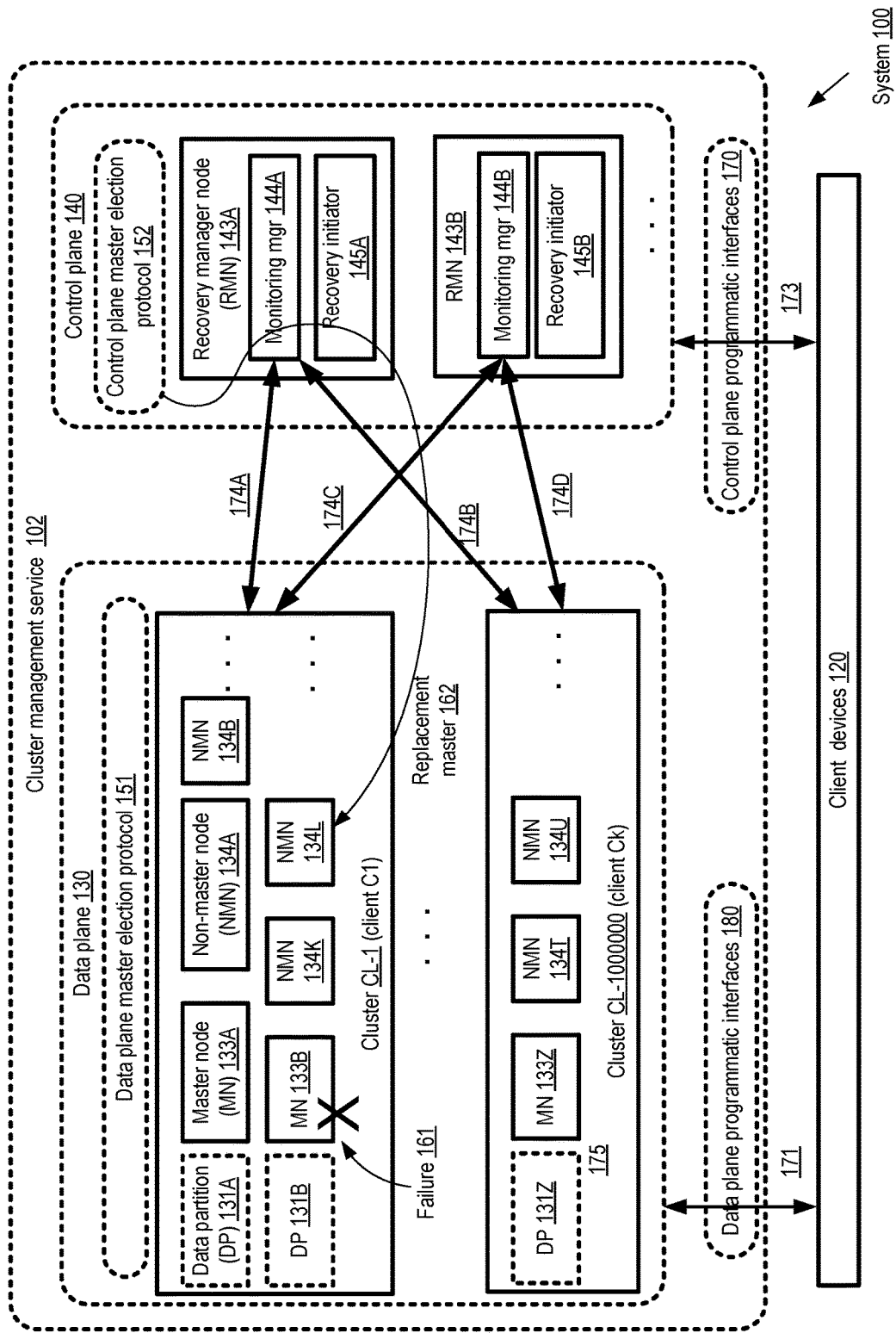
FIG. 1 illustrates an example system environment in which a hybrid technique involving a combination of control plane and data plane components may be utilized to identify a replacement master node of a cluster, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of methods and apparatus for the recovery of clusters using a combination of data plane and control plane entities of a network-accessible service are described. In one embodiment, a subset of the resources of a network-accessible service may be categorized as data plane components if they store and/or manipulate application data of various clients, while other resources of the service which are primarily used for administrative purposes and typically do not store or manipulate application data may be referred to as control plane components. According to one such embodiment, a distributed application may be run using a plurality of data plane nodes of a service configured as a cluster, with one or more data plane nodes of the cluster being designated as "master" nodes at a given point in time, while the remaining data plane nodes are designated as non-master (or "slave") nodes. A master node, may, in one embodiment, be responsible for performing a different mix of tasks than a non-master node. For example, in the case of a database service in one embodiment, a master node may be responsible for responding to write requests directed towards a set of data objects, as well as for responding to at least some read requests, while a non-master node may be responsible for responding only to read requests. In order for the application to work correctly, in one embodiment at least one master node may be required to be functioning (e.g., responsive to network messages) within any given cluster. In some embodiments as discussed below, a data set being stored at or managed by a cluster may be logically divided into a plurality of partitions, with a respective master node being designated for individual ones of the partitions.

According to one embodiment, a master election protocol involving the participation of various data plane nodes of a cluster may be used to designate a master of the cluster under some operating conditions. For example, a quorum-based protocol may be used in such an embodiment, in which some or all member nodes of a cluster are granted voting privileges. If and when a new master node is to be selected, according to the protocol, the vote or approval of at least a majority of the nodes of a cluster to which voting privileges are granted may be required to designate a particular non-master node as a new master node. In at least some embodiments, depending on the rules of the data plane master election protocol in use, under certain kinds of failure scenarios, a cluster may reach a state in which a new master cannot be elected successfully by the data plane nodes. For example, consider a scenario in which a cluster has N voting nodes, of which at least a majority ((N/2)+1) nodes are required to communicate with one another to form a quorum to elect a new master node. If the network has been temporarily partitioned in such a way that no single network partition contains the required quorum for at least some time period, the data plane master election protocol may be unable to select a new master node within a required time period. In such an example scenario, the lack of a replacement master may render at least a portion of the cluster inoperable—e.g., if the needed replacement master was responsible for handling write requests to a particular subset of a database, that subset of the database may be effectively unavailable to clients of the database for updates.

In one embodiment, components of the control plane of a cluster management service may be configured to detect scenarios in which the member nodes of a cluster may be unable to successfully elect a replacement master using the cluster's standard data plane election protocol, and to take actions to recover/restore the functionality of the cluster in such scenarios. In one embodiment, for example, one or more recovery manager nodes (which may also be referred to simply as recovery managers) may be established in the control plane. A given recovery manager node may be responsible for monitoring the intra-cluster connectivity status of one or more clusters in such an embodiment, e.g., by periodically querying individual nodes of the cluster to obtain each node's connectivity status with respect to other nodes of the cluster. Depending on the results of the monitoring of the data plane member nodes of the cluster, and/or on other metrics which may be collected from various sources as discussed below in further detail, in one embodiment the recovery manager may be able to detect that a given cluster is in a state in which the data plane master election protocol is highly unlikely to succeed. In such an embodiment, the recovery manager may initiate the selection of a replacement master node by the control plane, e.g., using a control plane master election protocol which takes several factors into account as discussed below, and notify at least some member nodes of the cluster that a replacement master has been selected. In at least some embodiments, such an intervention by a control plane component may speed up the recovery of the cluster and reduce the impact of some types of failure events on client applications.

In some embodiments, a gossip protocol may be employed by the data plane member nodes of a cluster to determine inter-node connectivity. In a gossip protocol, in one embodiment a given node N1 of a cluster may periodically select some subset {N2, N3, . . . } of the remaining nodes in the cluster, e.g., using random selection, and send messages to the selected subset, requesting each targeted node to send back a response indicating that it is functional and responsive. With respect to each of the targeted nodes which sends back a response, in one implementation N1 may store a connectivity record indicating that a response was received, e.g., together with a timestamp or some similar timing information. An overview of the state of network connectivity among the nodes of the cluster may be obtained, at least in principle, by collecting the connectivity records stored at individual ones of the nodes on such an embodiment. In some embodiments in which such a gossip protocol is employed, a control plane component of the cluster management service such as a recovery manager node may submit queries via programmatic interfaces to the member nodes reachable from the control plane, and obtain the connectivity records of the gossip protocol in response. In other embodiments, other protocols may be used at the cluster member nodes to determine connectivity to other member nodes—e.g., a deterministic approach rather than random selection of peer member nodes may be used. A recovery manager node may obtain connectivity information in various embodiments from various member nodes of the clusters assigned to it, regardless of the specific protocol which was used at the nodes to generate the connectivity information. In at least one embodiment, instead of querying the member data plane nodes of a cluster, other techniques for obtaining data plane connectivity status pertaining to various member nodes of the cluster may be used by a recovery manager node—for example, the data plane nodes may publish their connectivity records to a database which can be read by a recovery manager, or a separate monitoring service may collect connectivity status information of the cluster and provide it to a recovery manager node.

In at least one embodiment, a plurality of recovery manager nodes may be established in the control plane of a cluster management service, and the recovery managers may exchange connectivity status information pertaining to various clusters with one another. In one embodiment, for example, the cluster management service may be established within a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). Respective recovery manager nodes may be established in different data centers in some embodiments, and a given recovery manager node may be configured to communicate with nodes (e.g., data plane nodes of various clusters, as well as other recovery manager nodes) in other data centers as well as its own data center. As a result of the propagation of connectivity information among the recovery manager nodes, in one embodiment it may become possible for a given recovery manager to confirm its view of the state of a given cluster using the information obtained from other recovery manager nodes, e.g., before the given recovery manager takes any action to intervene in a data plane master replacement process.

In one embodiment, a provider network at which a cluster management service is implemented may be organized into a plurality of geographical regions, and each region may include one or more availability containers, which may also be termed "availability zones". An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers, distributing the nodes of a given SMS across multiple availability containers. In at least one embodiment, a given recovery manager node may collect connectivity information for cluster nodes in one or more availability containers, e.g., by communicating with other recovery manager nodes, by communicating with other devices within the availability containers, and so on. As a result, in such an embodiment, a failure event which affects an entire availability container may be detected by the recovery manager, and the recovery actions initiated (or not initiated) may take the availability container-level failure into account.

According to one embodiment, when selecting a particular node as a replacement master node for a given cluster, a recovery manager node may take numerous factors into account. For example, in one embodiment in which a cluster is used for storing data objects, a master node may be responsible for processing write requests, storing updated data locally and propagating the updates to non-master nodes in an asynchronous manner. As a result, at a given point in time, different non-master nodes may have replicated different subsets of the data in such an embodiment. In one embodiment, the progress made by different non-masters with respect to replicating writes may be taken into account by the recovery manager node. For example, in one implementation a respective write sequence number or logical offset may be maintained by various non-master nodes, indicating the most recent write which has been processed at the non-master, and the particular non-master which has made the most progress with respect to replicating updates to data items (as indicated by the sequence number or offset) may be selected from among the eligible non-master nodes to become the next master node. In at least one embodiment, the connectivity status of the non-master nodes to other non-master nodes may also be taken into account. For example, the recovery manager may try to ensure that the non-master node being selected as the replacement master has sufficient network connectivity to other nodes to ensure that the cluster is operational (or can quickly become operational) once the master responsibilities are granted to the selected non-master in such an embodiment. Other factors, such as the computing or storage capabilities of the non-master nodes, may also or instead be taken into account during the control plane's selection of the replacement master in some embodiments.

In a large distributed environment, in one embodiment some apparent failures may be "false positives", i.e., a failure may have been indicated due to network glitches or delays even though all the underlying hardware and software components continue to function. Furthermore, it may be the case in at least some embodiments that automated recovery actions (such as a quick reboot of a host configured as a master node of a cluster) may be initiated as soon as an apparent failure is detected. In one embodiment, the recovery manager may attempt to ensure that if a given cluster enters or re-enters a stable or consistent state, with a viable and responsive master node, before the process of establishing a replacement master selected by the control plane is completed, the control plane's selection of the replacement master is abandoned or aborted. In such an embodiment, the recovery manager may attach a race condition avoidance directive to the information it sends to cluster member nodes regarding its choice of a replacement master, so that the choice made by the control plane does not result in a misconfiguration if a functioning master node has already been identified by the data plane. In effect, a conditional and atomic designation of the replacement master may be made by the recovery manager in such an embodiment, with the recovery manager's decision coming into effect only if the cluster has not reached a state with a functioning master node by the time that the information about the decision reaches the nodes to which the information is directed.

A given recovery manager node may monitor, and if needed, participate in the recovery of numerous clusters in at least one embodiment. For example, hundreds or thousands of nodes may be monitored by a single recovery node in one implementation, thereby amortizing the costs of the hybrid approach towards master selection. The hybrid technique, in which the control plane intervenes only after a determination is made that a data plane master election protocol is not going to succeed (or at least has a low probability of succeeding) may be employed for a variety of clustered services in some embodiments. For example, the hybrid approach may be used for clusters established at a distributed in-memory database service, where individual nodes of the cluster store replicas of at least a portion of the data objects of a database in one embodiment. In other embodiments, the approach may be used for compute clusters whose nodes comprise virtual and/or physical machines, for persistent database clusters, and so on.

In one embodiment, a distributed workload distribution protocol may be implemented at the control plane of the cluster management service, e.g., to respond to potential failures of individual recovery manager nodes themselves. For example, in such an embodiment, each recovery manager node may be assigned a set of cluster nodes to query, and the list of nodes which are to be queried by a given recovery manager node may be stored in a persistent repository or replicated at multiple recovery nodes. If a given recovery manager node RMN1 fails (or appears to fail, from the perspective of other recovery manager nodes), in one embodiment the monitoring workload which was initially assigned to RMN1 may be re-distributed among one or more other recovery manager nodes. In some embodiments, multiple recovery manager nodes may be assigned to monitor a given member node of a cluster, so that if a single recovery manager node fails, or a small number of recovery nodes fail, the control plane is still able to recover data plane clusters using the techniques described above. Various types of failover mechanisms may be used to transfer monitoring and recovery operations from a failed recovery manager node to a replacement recovery manager node in at least some embodiments.

According to at least some embodiments, the hybrid approach towards responding to apparent or real node failures described above may be applied towards nodes which are not necessarily assigned "master" versus "non-master" roles. For example, in one embodiment, the data plane nodes of a given cluster may be assigned one of many different roles, such as "web-based request receiver", "middleware processer", "back-end data store", etc. and so on, and a data plane election protocol may be usable for identifying replacement nodes for at least some of the different roles from among a pool of candidate nodes. In such an embodiment, control plane nodes of a cluster management service may monitor nodes to which the various roles have been assigned, and in response to determining that the data plane's election protocol is unlikely to succeed for a given failed node, select a replacement at the control plane based on one or more factors and communicate the selection results to the control plane nodes. In another embodiment, a similar approach may be used even if distinct roles are not assigned to individual data plane nodes of a cluster—e.g., all the data plane nodes of a given cluster may perform the same functions, and a data plane replacement protocol for a given a failure may be augmented using recovery manager nodes in the control plane.

Example System Environment

FIG. 1 illustrates an example system environment in which a hybrid technique involving a combination of control plane and data plane components may be utilized to identify a replacement master node of a cluster, according to at least some embodiments. As shown, system 100 may comprise a cluster management service 102 in the depicted embodiment, which in turn includes a set of data plane components 130 and a set of control plane components 140. The data plane components 130 may be used to store, process and/or manipulate application data for various clients of the service 102 in the depicted embodiment, while the control plane components 140 may be used for administrative operations such as establishing or tearing down clusters in the data plane, monitoring the status of clusters, and so on. A set of control plane programmatic interfaces 170 may be used to submit requests 173 and receive corresponding responses for various types of administrative operations from client devices 120 in the depicted embodiment. A set of data plane programmatic interfaces 180 may be used from client devices 120 to access or modify application data using requests 171 and corresponding responses in the depicted embodiment.

The data plane 130 may comprise a plurality of clusters established, e.g., in response to requests 173, on behalf of various clients in the depicted embodiment. For example, cluster CL-1 may have been established on behalf of a particular client Cl, while cluster CL-10000000 may have been established in behalf of a different client Ck. As suggested by the example cluster names CL-1 and CL-10000000, a large number (e.g., up to millions in some embodiments) of clusters may be set up in the depicted embodiment using the cluster management service 102. In one embodiment, within a given cluster, one or more master nodes (MNs) 133 may be established, and zero or more non-master nodes (NMNs) 134 may be established. Thus, for example, cluster CL-1 comprises master nodes 133A and 133B, established for respective data partitions (DPs) 131A and 131B of client Cl's data, while cluster CL-1000000 comprises master node 133Z for a data partition DP 131Z of client Ck's data. In the depicted embodiment, the master nodes 133 (e.g., 133A, 133B or 133Z) may be used to process writes or updates directed to the corresponding data partitions, while the non-master nodes 134 (e.g., 134A, 134B, 134K, 134L, 134T or 134U) may be used to handle read requests. A master node 134 may handle some reads as well as writes in at least one embodiment, and may be responsible for propagating writes to the NMNs of its data partition in at least some embodiments.

A data plane master election protocol 151 which, in a given cluster, involves the participation of at least some of data plane nodes, may be used at various clusters such as CL-1 and CL-1000000 in the depicted embodiment. For example, according to one election protocol 151, in order to select a replacement master node in the event that a given master node 133 becomes unavailable or inaccessible, a majority of other masters (if such a majority remains active and if members of the majority can communicate with one another) may be needed. According to another election protocol 151, in another embodiment, a majority of master or non-master nodes may be sufficient—that is, voting privileges need not be restricted to master nodes alone.

According to one embodiment, the control plane 140 may comprise a plurality of recovery manager nodes (RMNs) 143, such as RMN 143A and RMN 143B. Individual ones of the RMNs 143 may be configured to monitor various aspects of the state of one or more data plane clusters such as CL-1 and CL-10000000 in the depicted embodiment. For example, individual ones of the MNs and/or NMNs of a given cluster may use a gossip protocol to determine the connectivity among various nodes of the cluster in some embodiments, and an RMN 143 assigned to the given cluster may query some or all nodes of the cluster to collect the connectivity records generated at the nodes. In some embodiments, as indicated by the arrows 174A-174D, a monitoring manager 144 (e.g., 144A or 144B) of a given RMN 143 may query nodes of a plurality of clusters to obtain connectivity data local to each of the clusters. In at least one embodiment, an RMN 143 such as 143A may exchange or transmit at least some of the connectivity data it has obtained with other RMNs such as 143B. In some embodiments, instead of or in addition to querying the data plane nodes, an RMN 143 may use one or more other techniques to obtain connectivity status information pertaining to the data plane nodes—e.g., the data plane nodes may publish or push their connectivity status information to a repository which can be accessed by the RMNs, or a separate monitoring service may be responsible for collecting connectivity status information from the cluster data plane nodes and providing it to the RMNs.

In the event of an apparent failure such as failure 161 of MN 133B associated with a given cluster such as CL-1, in one embodiment a given RMN such as RMN 143A may be able to use the results of the queries it has directed to data plane nodes and/or other sources of connectivity status information (such as transmissions of collected metrics from other RMNs) to determine whether the data plane election protocol 151 is likely to succeed or not. That is, in such an embodiment, an RMN 143 may be able to determine whether a replacement master node for the cluster at which the failure occurred can be elected by member nodes of the first cluster using the data plane election protocol of the cluster. The RMN 143 may, for example, construct a graph of the connectivity between various nodes of the cluster in one implementation, and verify at least some of the edges of the graph (which indicate that the nodes lined by the edge are able to communicate with one another) using multiple sources (such as the nodes themselves, other RMNs, other hardware and software monitoring tools, and the like).

If an RMN 143 such as 143A makes the determination that the data plane master election protocol is not going to succeed, or has a probability below a threshold of succeeding, the RMN may take corrective action in the depicted embodiment. For example, a recovery initiator subcomponent 145 (e.g., 145A or 145B) of the recovery manager node may select a replacement master node for the affected cluster in one embodiment, based on factors or rules indicated in a control plane master election protocol 152. In one implementation, for example, NMN 134L may be selected as a replacement master node (as indicated by arrow 162) for MN 133B based at least in part on an indication of progress of replication of data items at NMN 134L or an indication of connectivity of NMN 134L to other nodes of CL-1.

After the replacement master node has been selected at the control plane, messages indicating the selection may be transmitted to one or more nodes of the affected cluster, and/or to other RMNs in the depicted embodiment. In at least one embodiment, it may be possible that the apparently failed node MN 133B comes back online before the configuration changes indicating that NMN 134L is the new master have been applied. In one embodiment the messages sent by an RMN to data plane nodes may contain directives that if the affected cluster reaches a certain state (e.g., with a functioning master node acknowledged by some number of other nodes) before configuration changes corresponding to the control plane's master replacement decision have been applied, the master replacement decision made at the control plane should be disregarded or abandoned. Such directives may be included in the messages, for example, to avoid configuration errors resulting from race conditions in which attempts to designate multiple master nodes for the same partition are made near-concurrently.

Propagation of Writes and Collection of Connectivity Information

Figure 2:
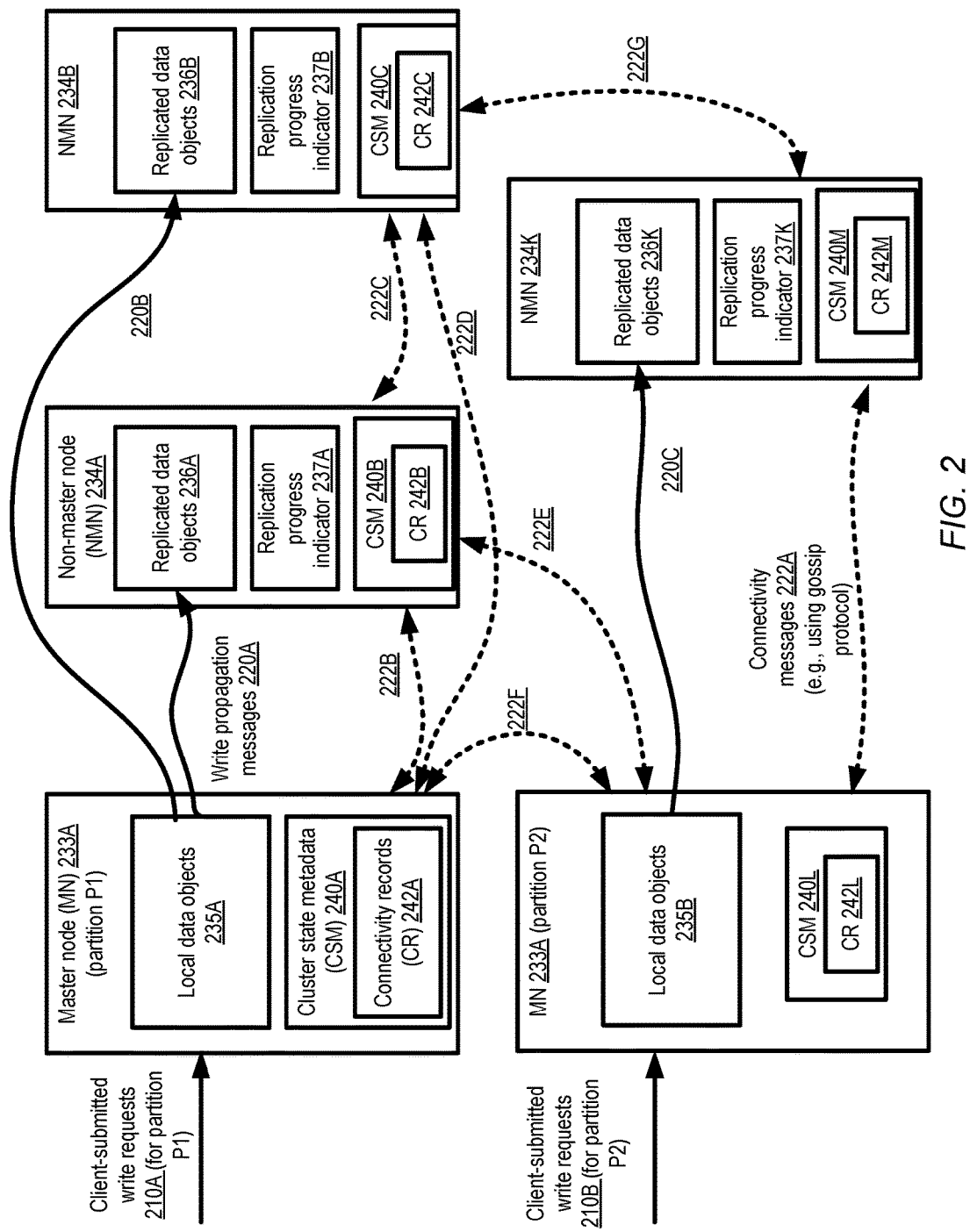
FIG. 2 illustrates examples of the propagation of writes and the collection of inter-node connectivity information among the nodes of a cluster, according to at least some embodiments.

The cluster recovery techniques described herein may be used in the context of a distributed storage or database service in some embodiments (such as an in-memory database service in which data objects are stored in volatile memories at the member nodes of a cluster, or a persistent database service in which at least portions of the data are stored on non-volatile media such as disk drives and the like). In one such embodiment, the master nodes of a cluster may be responsible for processing client-submitted write requests and propagating the writs to at least some non-master nodes. In addition to the network messages used for write propagation, messages may also be exchanged among the nodes of a cluster to test or verify connectivity among the member nodes of the cluster in some embodiments. FIG. 2 illustrates examples of the propagation of writes and the collection of inter-node connectivity information among the nodes of a cluster, according to at least some embodiments.

A cluster comprising master nodes (MNs) 233A and 233B, and non-master nodes (NMNs) 234A, 234B and 234K may be established at a storage service in the depicted embodiment. MN 233A, NMN 234A and NMN 234B may be designated for a partition P1 of a data set of a client on whose behalf the cluster is established, while MN 233B and NMB 234K may be designated for a different partition P2. The boundaries or definitions of the partitions may be application-dependent—e.g., in some embodiments, hash-based partitioning may be used based on some attribute combination of the data records stored, while in other embodiment range-based partitioning may be used. Client-submitted write requests 210A for partition P1 may be directed towards MN 233A in the depicted embodiment, while client-submitted write requests 210B may be directed towards MN 233B.

At a given master node 233, a local copy of the updated data corresponding to a given write may be stored in a collection of local data objects 235 (e.g., 235A or 235B) in the depicted embodiment. Write propagation messages 220 (e.g., 220A, 220B or 220C) may be sent from the master nodes to zero or more non-master nodes in some embodiments, so that eventually individual ones of the non-master nodes 234 have local replicas 236 (e.g., 236A or 236B) of the updated or written data objects. In the depicted embodiment, individual write may have respective write sequence numbers or logical timestamps associated with them, and such sequence numbers or timestamps may serve as replication progress indicators 237. For example, replication progress indicator 237A at NMN 234A may indicate the most recent data item write that has been propagated to NMN 234A, replication progress indicator 237B may indicate the most recent data item write that has been applied at NMN 234B, and replication progress indicator 237K may indicate the most recent data item write that has been processed at NMN 234K in the depicted embodiment. In at least some embodiments, the replication of the writes may not be synchronized across all the NMNs 234—e.g., at a given point in time, more of the data stored in local data objects 235A may have been replicated at NMN 234B than at NMB 234A, or vice versa. The replication progress indicators may be used to select a particular NMN as a replacement master node in at least one embodiment by a control plane component of a cluster management service such as a recovery manager node.

In the embodiment depicted in FIG. 2, connectivity messages 222 may be transmitted from various nodes of the cluster to other nodes, e.g., in accordance with a gossip protocol. For example, MN 233B may have recently exchanged connectivity messages with MN 233A (as indicated by arrow 222F), NMN 234A (arrow 222E) and NMN 234K (arrow 222A). A given exchange of connectivity messages may involve, for example, randomly selecting a particular node with which to verify connectivity, sending that node a message, and receiving a response to the message within some selected timeout period in the depicted embodiment. On the basis of the successfully exchanged connectivity messages 222, each of the cluster nodes in the depicted embodiment may generate and store a set of connectivity records 242 (e.g., 242A, 242B, 242C, 242L and 242M) as part of locally stored cluster state metadata 240 (e.g., 240A, 240B, 240C, 240L and 240M). The cluster nodes (e.g., MNs as well as NMNs) may implement programmatic query interfaces in the depicted embodiment, which may enable control plane components such as recovery manager nodes to query the cluster nodes obtain the connectivity records. As a result, in the depicted embodiment, it may be possible for a control plane component to obtain each cluster node's view of its own connectivity with respect to other nodes of the cluster. Such information may be used, for example, in one embodiment to determine whether an intervention or overriding of the data plane master election protocol is appropriate (e.g., if the data plane election protocol appears to be deadlocked or appears to have failed), and if so, the particular node which should be elected as a replacement for a failed or unreachable master node.

Method for Hybrid Control Plane and Data Plane Cluster Recovery

Figure 3:
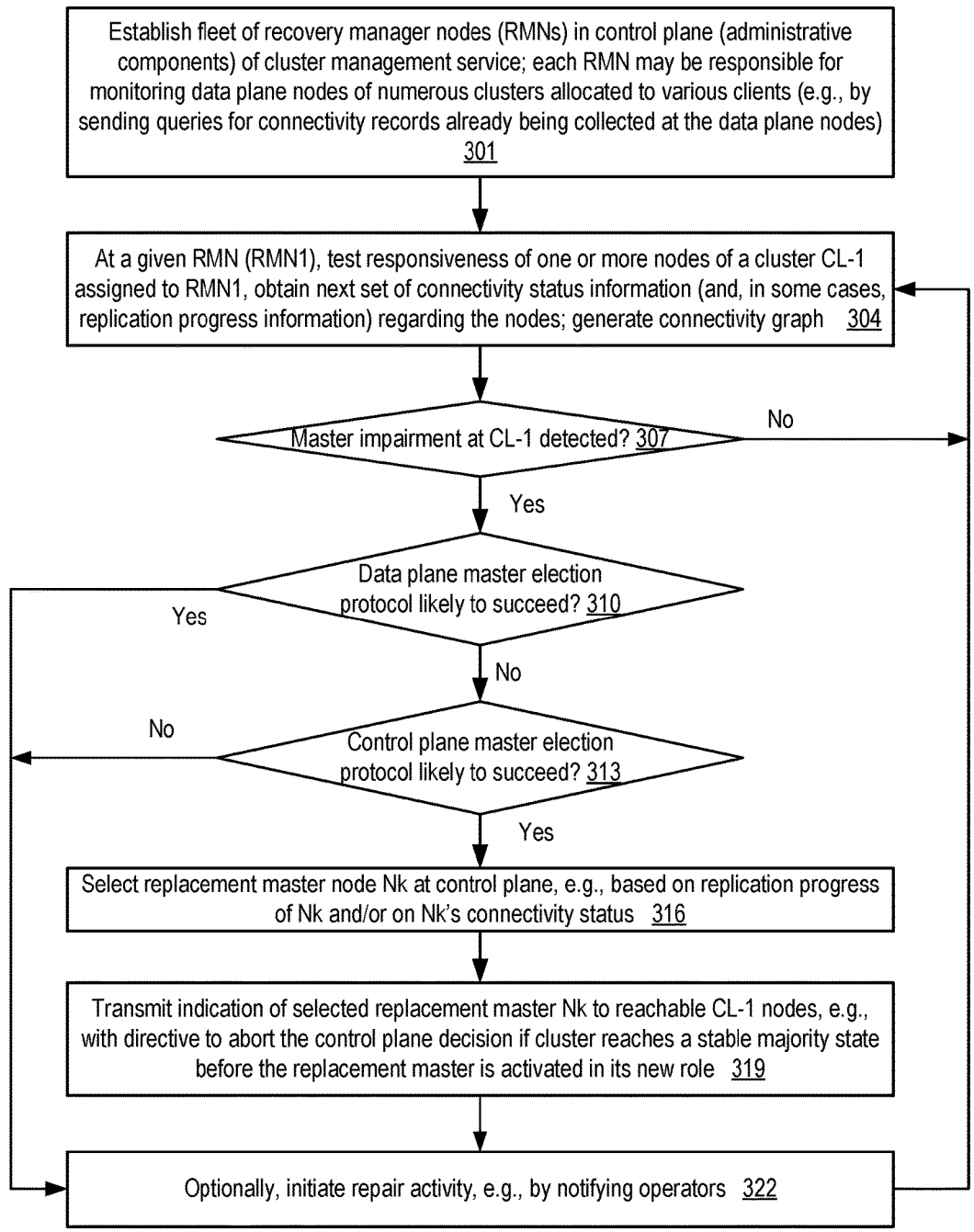
FIG. 3 is a flow diagram illustrating aspects of operations which may be performed to implement a hybrid control plane and data plane response to a master node failure in a cluster, according to at least some embodiments.

FIG. 3 is a flow diagram illustrating aspects of operations which may be performed to implement a hybrid control plane and data plane response to a master node failure in a cluster, according to at least some embodiments. As shown in element 301, a fleet of recovery manager nodes (RMNs) may be established in the control plane of a cluster management service in the depicted embodiment. A given RMN may be responsible for monitoring a set of data plane member nodes of one or more clusters in the depicted embodiment, and for taking corrective actions in the event of certain types of failures at the clusters. In at least some implementations, a single RMN may be designated to monitor numerous clusters allocated to a variety of clients of the service. In one embodiment, to monitor a given node, an RMN may issue queries via a programmatic interface (e.g., an application programming interface (API) or a command line tool) to the monitored nodes, and receive responses indicating the connectivity status of the node. In some embodiments, the connectivity status may be determined at the node based on messages exchanged with other nodes of the cluster in accordance a gossip protocol as part of the normal functioning of the cluster—that is, no extra work may be required from the cluster nodes for the generation of the connectivity records, although a small amount of extra work may be needed to respond to the RMN's queries. In other embodiments, connectivity records may be generated at the nodes using other non-gossip protocols. In one embodiment, an RMN may use other sources to monitor the state of connectivity and/or functionality of the various cluster nodes—e.g., monitoring agents installed in various computing devices or networking devices such as routers and the like may be used, or performance tools installed at the cluster nodes may be used.

At a particular recovery manager node RMN1, the responsiveness of the set of data plane cluster nodes assigned to RMN1 (such as one or more nodes of a cluster CL-1) may be tested in one embodiment, e.g., using queries of the kind discussed above (element 304). If a given cluster node responds to RMN1, the next set of connectivity records from that node may be collected in one embodiment. In at least one embodiment in which writes or updates are replicated asynchronously from master nodes to non-master nodes, respective replication progress indicators (indicating which updates to data items have been replicated most recently at each of the nodes) may also be obtained for at least some of the non-master nodes which respond to RMN1 queries. In some embodiments, based on the next set of responses from the data plane nodes and/or on other data sources (such as other RMNs with which RMN may exchange connectivity information), a connectivity graph for one or more clusters being monitored at least partly by RMN1 may be generated.

In some embodiments, based on analyzing the connectivity status information (e.g., as represented in the connectivity graph) and/or input from other data sources, RMN1 may determine whether a master node of cluster CL-1 is, or appears to be, impaired (i.e., whether the master node is functioning sufficiently for client operations directed to CL-1 to succeed) (element 307). Such impairment may be detected, for example, if the hardware and/or software of the master node has failed, or if one or more network pathways to the master node have failed or are so congested that traffic is not flowing at acceptable performance levels to the master node. In at least one embodiment, the determination that the master node is impaired may be probabilistic—that is, RMN1 may use its collected monitoring results to assign a probability of impairment to the master node. In such an embodiment, further action regarding recovery may be initiated only if the probability of impairment exceeds a threshold. In one embodiment, before making a determination that a master node has failed or that the probability of such a failure exceeds a threshold, RMN1 may attempt to use multiple data sources to verify the apparent status of the master node—e.g., connectivity information collected initially by other RMNs may be checked to try to avoid false positives regarding impairment.

If, in operations corresponding to element 307, insufficient evidence indicating that a master node has been impaired is found, RMN1 may resume its normal operations in the depicted embodiment, e.g., by waiting for a preselected time interval and re-querying the set of cluster nodes for which it is responsible. If sufficient evidence is found which indicates an impairment of a master node in operations corresponding to element 307, RMN1 may make a determination as to whether a data plane master election protocol is likely to succeed (element 310) in the depicted embodiment. Such a determination may be made, for example, based on analyzing the connectivity graph in one embodiment—e.g., if the graph reveals that the network used for the cluster has been partitioned in such a way that a quorum needed for a master replacement selection decision using the data plane protocol cannot be reached, this may indicate that the data plane master election protocol is very unlikely to complete successfully. In at least some embodiments, the decision as to whether the data plane master election protocol will succeed or not may be probabilistic.

In one embodiment, according to the data plane cluster configuration settings, a non-master node may be able to initiate a failover from a master node to the non-master node under certain conditions. However, in such an embodiment, a given non-master node NMN1 may sometimes enter a state in which NMN1 will not attempt a failover from the master. Such a state may be reached in some embodiments after a timeout (e.g., set using a tunable parameter such as the "cluster-slave-validity-factor" parameter of the Redis in-memory database system) has expired since the last time NMN1 communicated with a master node. In some embodiments, RMN1 may be able to determine, e.g., from the responses to its queries, whether any of the NMNs have reached such a state, and may use this state information to determine whether the data plane master election protocol is likely to succeed or not. If, for example, all the non-master nodes which could have initiated failovers from a master have reached such a state in which they are not going to initiate a failover, in one embodiment this could indicate to RMN1 that the data plane master election protocol will not succeed.

If, in operations corresponding to element 310 in the depicted embodiment, RMN1 determines that the data plane master election protocol will succeed, or at least has a high probability of success, RMN1 may determine whether any actions such as notifying or re-notifying operators to perform repairs on CL-1 should be taken. If so, such notifications may optionally be sent (element 322) in the depicted embodiment, and RMN1 may repeat the operations corresponding to element 304 onwards in its next iteration of monitoring.

In contrast, if RMN1 determines that the data plane master election protocol is unlikely to succeed or is sure to fail in operations corresponding to element 310, in the depicted embodiment RMN1 may determine whether a control plane master election protocol is likely to succeed (element 313). Such a determination may be made, for example, based at least in part on the completeness of the connectivity information which has been obtained by RMN1 thus far in the depicted embodiment. In effect, RMN1 may determine the probability that, if RMN1 selects a replacement master node and informs the nodes of CL-1 which are reachable from RMN1 regarding the designation of the replacement master node, CL-1 will be able to fulfill all the kinds of client requests (e.g., writes as well as reads in the case where Cl-1 is being used for data storage) for which CL-1 was initially established. In at least one embodiment, it may sometimes be the case that RMN1 has insufficient information (e.g., if a majority of the nodes of a cluster are unresponsive) to determine that a control plane selection of a replacement master node will lead to a fully functional cluster.

If RMN1 has enough information to determine that the selection of a replacement master at the control plane is likely to lead to a functional cluster in operations corresponding to element 313, one of the nodes Nk of CL-1 may be selected as a replacement master node (element 316) in the depicted embodiment. The selection of a particular node Nk as the new master may be based on a variety of factors in different embodiments, such as the replication progress indicator of Nk relative to other nodes, the extent to which Nk is connected to other nodes of CL-1, and so on. In at least one embodiment, a voting or consensus based protocol may be used at the control plane, in which multiple RMNs including RMN1 collectively select the replacement master node. An indication that Nk has been selected as the replacement master node may be transmitted to one or more of the CL-1 nodes which are reachable from RMN1 (element 319) in the depicted embodiment. In one embodiment, RMN1 may also include, in its message to a given node of CL-1, a directive that if CL-1 reaches a stable majority state or a functional state prior to the enactment of the control plane decision, the control plane's selection of Nk is to be abandoned, aborted or overridden. In the depicted embodiment, if needed based on its understanding of the failure states of various components of CL-1, RMN1 may optionally notify an operator to perform repair operations (element 322) and resume collecting and analyzing monitored information from the data plane nodes assigned to it (element 304 onwards).

It is noted that in various embodiments, some of the operations shown in FIG. 3 may be implemented in a different order than that shown in the figure, or may be performed in parallel rather than sequentially. Additionally, some of the operations shown in FIG. 3 may not be required in one or more implementations.

Replication Progress Indicators

Figure 4:
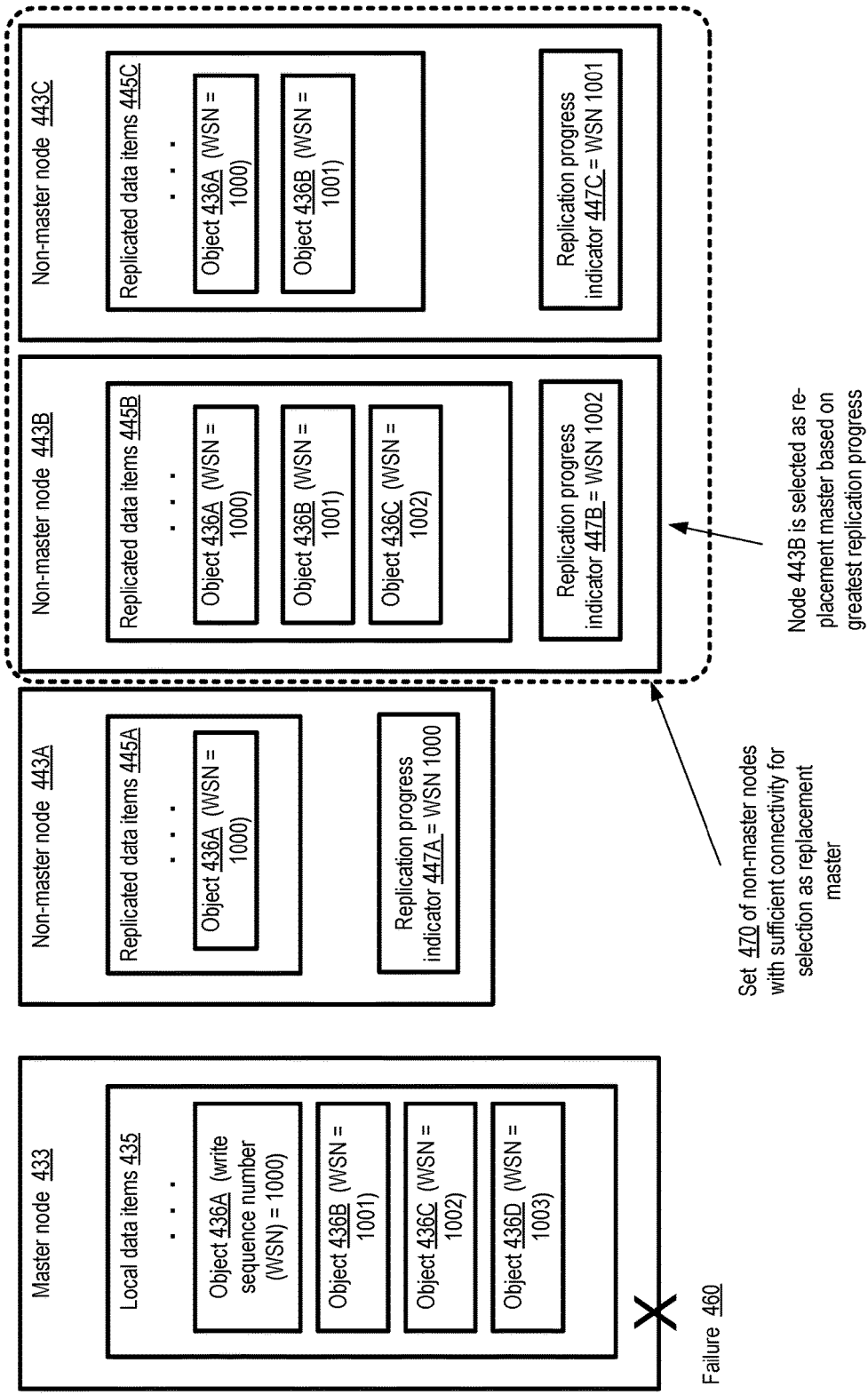
FIG. 4 illustrates an example of the use of replication progress indicators to select a replacement master node for a cluster, according to at least some embodiments.

FIG. 4 illustrates an example of the use of replication progress indicators to select a replacement master node for a cluster, according to at least some embodiments. In the depicted embodiment, a cluster initially comprising at least master node 433 and three non-master nodes 443A-443C is used to store a data set of a client, e.g., at a distributed database service. Writes to the data are directed to the master node 433 and propagated to the non-master nodes 443 in the depicted embodiment, with respective write sequence numbers (WSNs) associated with each update.

At the point of time corresponding to the example scenario depicted in FIG. 4, the four most recent updates or writes which have been processed at the master node 433 and stored in the collection of local data items 435 of node 443 are directed to objects 436A-436D, and have write sequence numbers 1000, 1001, 1002 and 1003 respectively. Writes with WSNs up to 1000 have been replicated at non-master node 443A, as indicated in replicated data items 445A. Writes with WSNs up to 1002 have been replicated at non-master node 443B, as indicated in replicated data items 445B, while writes with WSNs up to 1001 have been replicated at non-master node 443C as indicated in replicated data items 445C.

In one embodiment, when selecting a replacement master node at the control plane after a failure of a master node (such as failure 460), a set 470 of operational nodes of the cluster with sufficient connectivity to other nodes to enable any of the members of the set 470 may first be identified. In the example scenario shown, the set 470 of nodes eligible for the replacement master role includes nodes 443B and 443C. From among these nodes, one node of the subset which has made the most progress with respect to replication (e.g., the one with the highest replication progress indicator value), such as node 443B in the depicted example, may be selected as the actual replacement master in some embodiments. Since node 443B has the most recent replication updates among the members of set 470, less updated data would be lost (or have to be recovered) if node 443B were selected as the replacement master node in the depicted example scenario than if node 443C were selected. In other embodiments, factors other than connectivity and/or replication progress may be considered when selecting replacement master nodes at the control plane.

Abandoning Control Plane Replacement Master Designation

Figure 5:
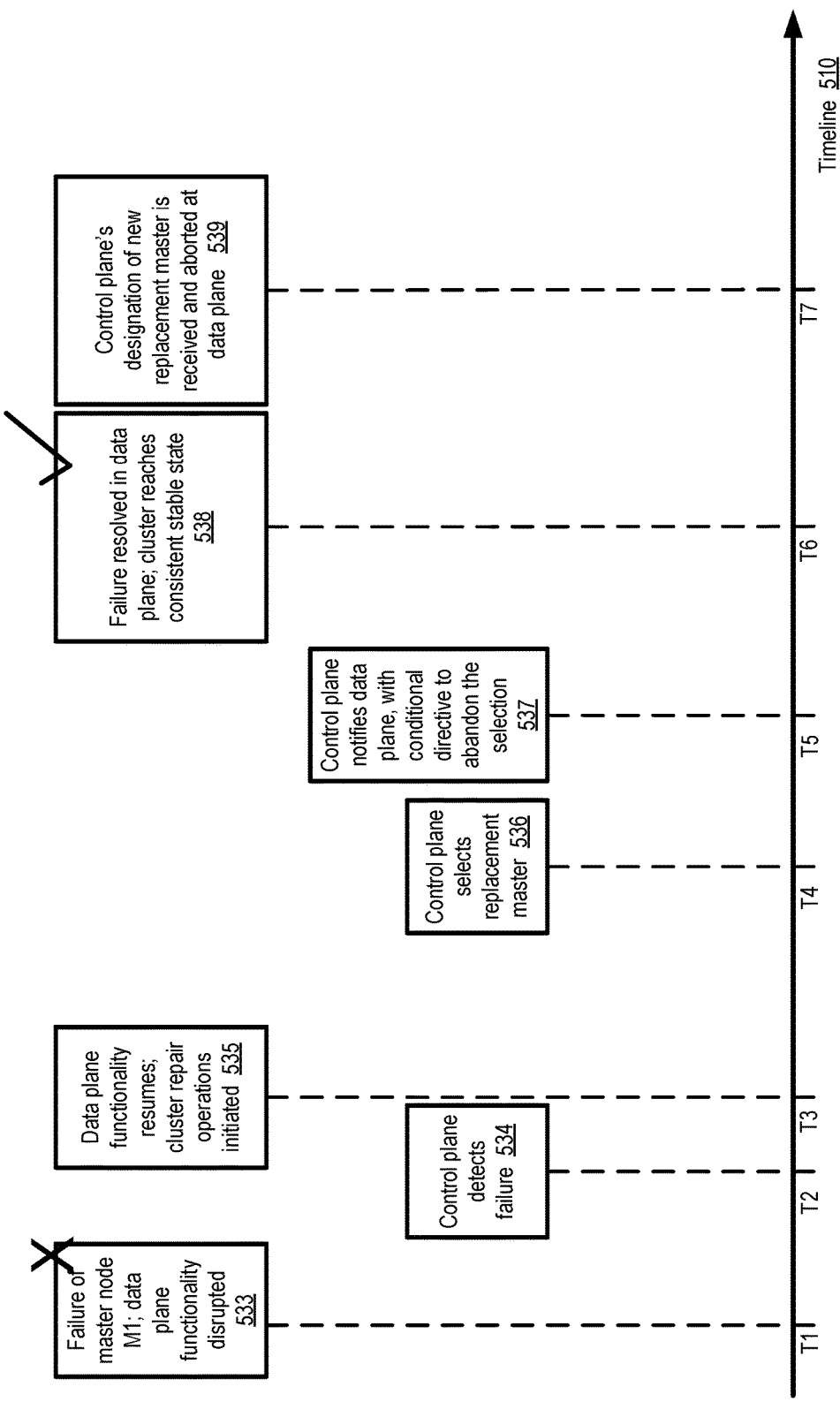
FIG. 5 illustrates an example scenario in which the designation of a replacement master selected by the control plane of a cluster management service may be abandoned if the affected cluster reaches a consistent state in a timely manner, according to at least some embodiments.

FIG. 5 illustrates an example scenario in which the designation of a replacement master selected by the control plane of a cluster management service may be abandoned if the affected cluster reaches a consistent state in a timely manner, according to at least some embodiments. In the depicted embodiment, a timeline 510 of events is shown. (It is noted that the relative placement of various events along timeline 510 is not intended to be representative of a realistic time scale in a real-world implementation.) At some time T1 along the timeline, a failure event 533 associated with a master node M1 of a particular cluster occurs. The failure may result in partially or fully disrupting the functionality of the data plane and/or its election protocol. The failure may be detected at the control plane, e.g., by a recovery manager node at time T2, as indicated by element 534 in the depicted embodiment.

Operations may be begun at both the control plane and the data plane to respond to the failure of the master node M1. Data plane cluster repair operations 535 (which may for example involve restarting a server or process used for the failed master M1) may be begun at time T3, e.g., after at least some of the functionality of the data plane has been restored. Meanwhile, in the control plane, a replacement master may eventually be selected at time T4 as indicated by element 536, e.g., after a determination is made that the data plane master election protocol is unlikely to succeed. The control plane may notify one or more of the nodes of the cluster regarding its decisions, e.g., by sending a message at time T5 as indicated in element 537. The message may also include a directive to abandon or ignore the selection of the replacement master at the control plane if the cluster has already reached a stable condition with a functional master by the time the notification is processed at the data plane.

In the example scenario depicted in FIG. 5, the failure of M1 may be resolved (e.g., by a restart or a replacement of M1) at time T6, as indicated in element 538. The notification regarding the selection of a replacement master by the control plane may be received at time T7, after the cluster has already stabilized and there is no longer any need to implement the control plane's selection decision. Accordingly, in the depicted embodiment, when the notification is received, the decision made at the control plane may be ignored. The control plane may be informed about the rejection of its decision in various ways in different embodiments. In one embodiment, for example, recovery manager nodes may determine the cluster configuration based on the responses received to their queries. In another embodiment, a data plane cluster node may respond to the notification, informing the control plane that the designation of the replacement node indicated in the notification has been rejected.

Redistribution of Monitoring Workload

Figure 6:
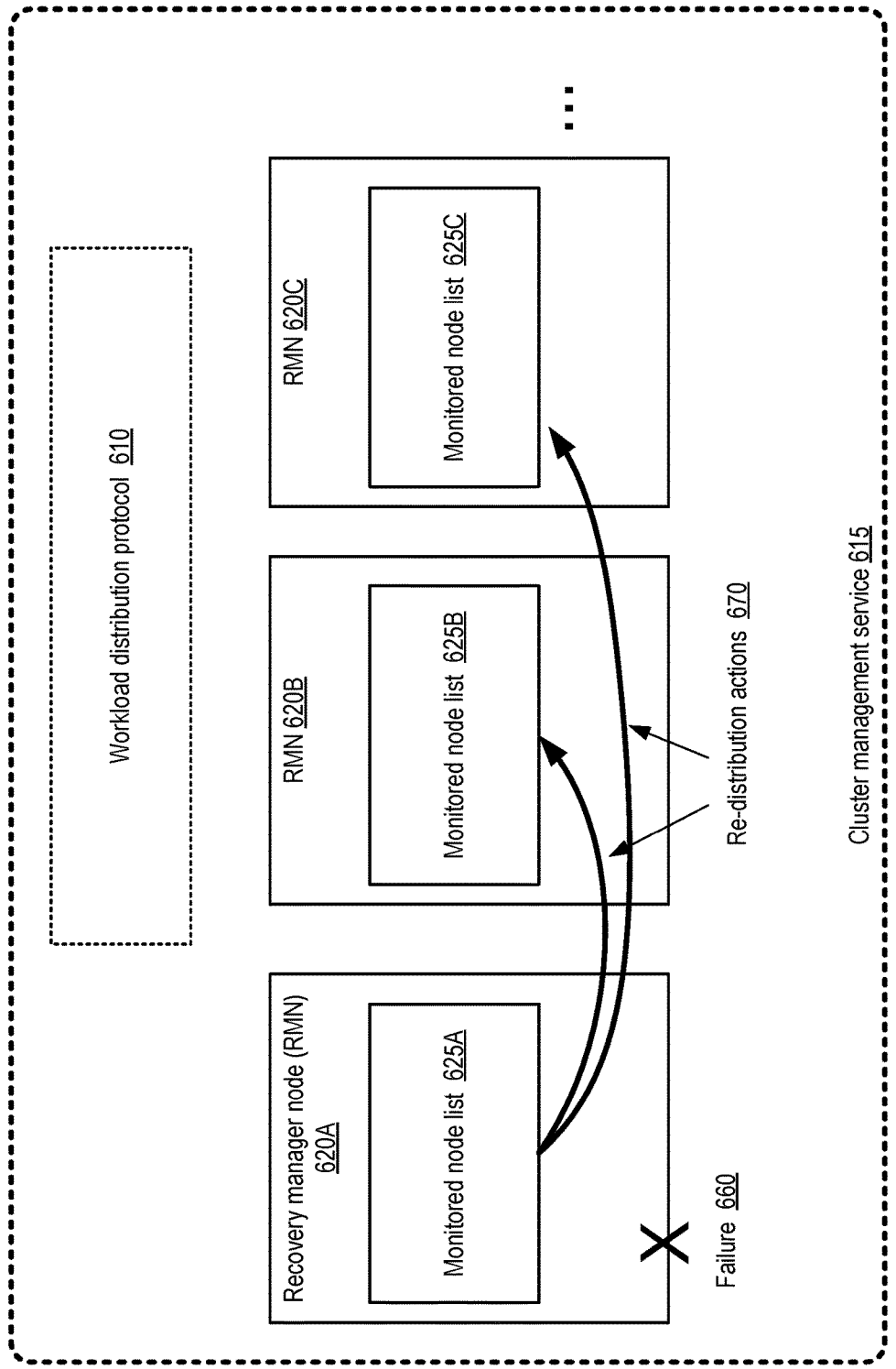
FIG. 6 illustrates an example of workload redistribution among control plane nodes responsible for monitoring clusters, according to at least some embodiments.

In some embodiments, recovery manager nodes may cooperate with one another, e.g., by exchanging monitoring results and/or by collaborating to distribute the monitoring workload as needed. FIG. 6 illustrates an example of workload redistribution among control plane nodes responsible for monitoring clusters, according to at least some embodiments. In the depicted embodiment, cluster management service 615 may comprise at least three recovery manager nodes 620A-620C. Each of the recovery manager nodes may be assigned a respective monitored node list 625 in the depicted embodiment, such as list 625A for recovery manager node 620B, list 625B for recovery manager node 620B, and list 625C for recovery manager node 620C. Each list may indicate one or more clusters, or one or more cluster nodes, which are to be monitored by the corresponding recovery manager node.

In addition to monitoring the cluster nodes, the recovery manager nodes 620 may also be responsible in the depicted embodiment for monitoring each other, e.g., by exchanging connectivity information periodically with other RMNs. As a result of such monitoring, a failure 660 at RMN 620A may eventually be detected by one or more of the other RMNs. In response to detecting and/or confirming such a failure, RMNs 620B and 620C may agree to redistribute at least a portion of RMN 620A's workload in some embodiments. In accordance with a workload redistribution protocol 610 of the cluster management service, in one embodiment the set of nodes in list 625A may be divided into approximately equal subsets, with each subset being redistributed to each of the remaining RMNs 620B and 620C in redistribution actions 670. In another embodiment, the current level of workloads of the RMNs 620B and 620C may be taken into account, e.g., so that an imbalance in their workloads can be addressed during the redistribution actions 670. In at least one embodiment, the redistribution may be temporary—e.g., after RMN 620A recovers or is replaced, the original workload distribution may be restored. In at least one embodiment, the monitored node lists 625 may be replicated—e.g., either at a database accessible from multiple RMNs, or at the RMNs themselves, so that it is possible for a given RMN to determine the monitored nodes assigned to another RMN. It is noted that in some embodiments, workload redistribution of the kind indicated in FIG. 6 may not be required, e.g., because each data plane cluster node may be monitored by a plurality of RMNs by default, so the failure of any single RMN (or even a small plurality of RMNs) may not be sufficient to prevent the successful implementation of the hybrid data plane and control plane recovery technique.

Monitoring Across Availability Container Boundaries

Figure 7:
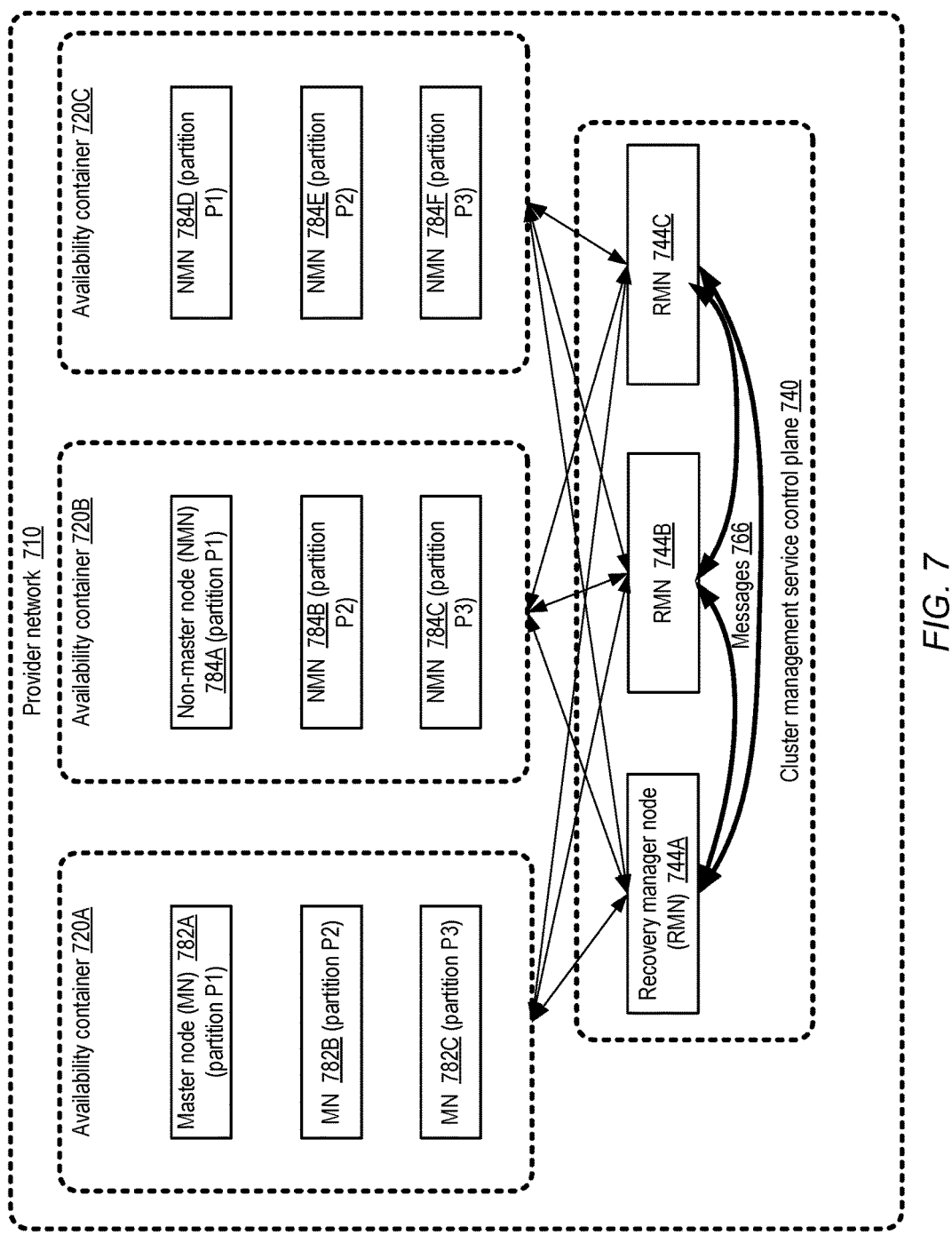
FIG. 7 illustrates an example scenario in which a hybrid cluster recovery technique may be utilized in an environment which includes multiple availability containers, according to at least some embodiments.

FIG. 7 illustrates an example scenario in which a hybrid cluster recovery technique may be utilized in an environment which includes multiple availability containers, according to at least some embodiments. As mentioned earlier, in one embodiment a provider network whose resources are distributed across multiple geographical locations may be organized as a plurality of availability containers. An availability container in such an embodiment may comprise portions or all of one or more distinct locations or data centers, engineered in such a way (e.g., with independent infrastructure components such as power-related equipment, cooling equipment, or physical security components) that the resources in a given availability container are insulated from failures in other availability containers. In the embodiment depicted in FIG. 7, a provider network 702 may include at least three availability containers 720A-720C.

Various master and non-master nodes of a particular cluster may be distributed among the availability containers 720 in the depicted embodiment. A data set being stored at or managed by the cluster may be divided into several partitions, such as partitions P1, P2 and P3, with respective master nodes (and one or more non-master nodes) being configured for each partition. For example, with respect to partition P1, a master node MN 782A may be instantiated in availability container 720A, and respective non-master nodes NMN 784A and 784D may be configured in availability containers 720B and 720C. Similarly, availability container 720A may include master nodes 782B and 782C for partitions P2 and P3 respectively, availability container 720B may include NMNs 784B and 784C for partitions P2 and P3 respectively, and availability container 720C may contain NMNs 784E and 784F for partitions P2 and P3 respectively. The availability containers used for various masters and non-masters may be selected in the depicted embodiment with the intention that even if an entire availability container becomes unavailable or unreachable, a stable majority of nodes (e.g., two out of the three nodes associated with a given partition) remains connected, enabling the cluster to continue functioning.

In the depicted embodiment, control plane 740 of a cluster management service may comprise a number of recovery manager nodes, such as RMNs 744A, 744B and 744C. A given RMN 744 may be responsible for monitoring cluster nodes (of one or more clusters) in one or more of the availability containers 720, and also for exchanging the monitoring results with other RMNs via messages 766. With respect to at least some cluster nodes, a given RMN may gather indirect monitoring information in the depicted embodiment—e.g., with respect to MN 782B, RMN 744B may monitor one or more other nodes in availability container 720A and may thereby be able to make determinations regarding the status of the connectivity of the availability container 720A as a whole. In the event of a detection of an apparent failure in one of the availability containers, a given RMN may be configured to use messages 766 to determine whether any other RMN has enough information to confirm (or contradict) the apparent failure, e.g., before taking actions responsive to the failure such as selecting a replacement master node at the control plane. In at least some embodiments, replacement master node selections may require a consensus or majority among the set of RMNs 744 associated with or assigned to the affected cluster. In one embodiment, information obtained about the state of connectivity between a given availability container and one or more nodes of a cluster may be used to determine whether a data plane master election protocol of the cluster is likely to succeed or not. For example, if an entire availability container has become disconnected from the rest of the provider network, and votes from one or more nodes within the disconnected availability container are needed to elect a replacement master using the data plane election protocol, in one embodiment an RMN 744 may determine that the data plane election protocol is not going to succeed (and in some cases, the cluster is not going to become fully functional) until the availability container becomes accessible from at least some other availability containers.

In one embodiment, instead of or in addition to being classified into availability containers, the resources of a provider network may be categorized into groups along dimensions other than availability, such as performance (e.g., measured performance or expected performance capacity), vendor, cost range, and the like. Availability containers may be considered one type of resource group in such an embodiment, while performance-based or cost-based resource groups may represent other approaches towards grouping resources. The different resource grouping techniques may be applied independently of each other in various embodiments. For example, in some embodiments, a given availability container may comprise resources of more than one performance-based resource group or cost-based resource group, and similarly, a performance-based resource group or cost-based resource group may include resources of more than one availability container. In some embodiments, information collected from more than one instance of one or more types of resource groups may be used to make control plane decisions associated with cluster recovery. For example, in one embodiment, monitoring information collected from multiple performance-based resource groups from respective recovery managers may be collected to determine or confirm whether a data plane master election protocol is likely to succeed or not, and/or to select a replacement master node.

Provider Network Environment

Figure 8:
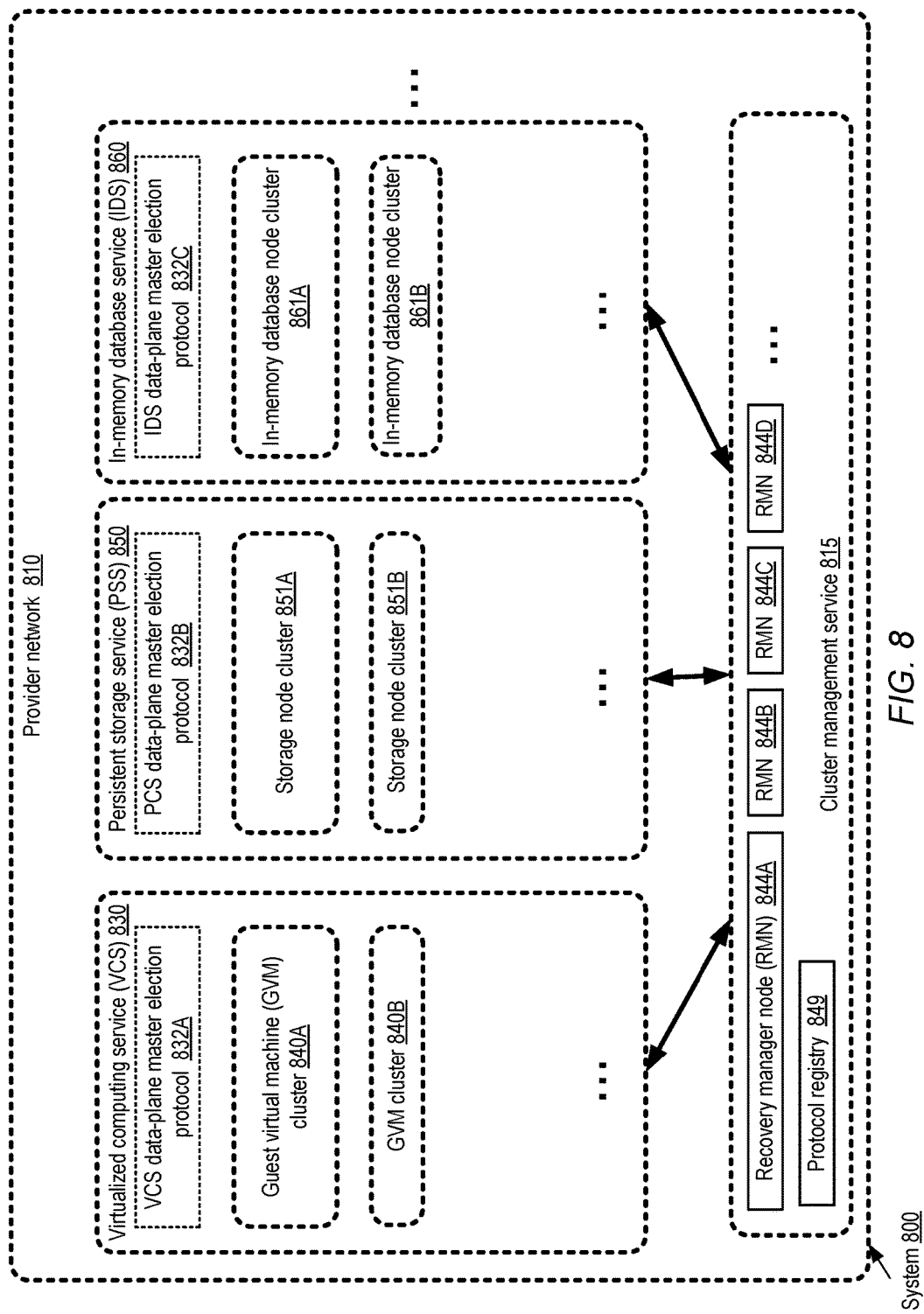
FIG. 8 illustrates an example system environment in which a hybrid cluster recovery technique may be utilized at several different services of a provider network, according to at least some embodiments.

The techniques of monitoring cluster nodes which are configured to use a particular data plane election protocol, and supplementing the data plane protocol with decisions made outside the cluster itself under certain types of failure conditions, may be used for clusters set up at various different services and for a variety of resource types of a provider network in some embodiments. FIG. 8 illustrates an example system environment in which a hybrid cluster recovery technique may be utilized at several different services of a provider network, according to at least some embodiments. In the depicted embodiment, provider network 802 of system 800 may comprise, among other services, a virtualized computing service (VCS) 830, a persistent storage service (PSS) 850, and an in-memory database service (IDS) 860, as well as a cluster management service 815.

In one embodiment, respective clusters may be configured using the resources available at the services 830, 850 or 860. For example, clusters 840A and 840B of guest virtual machines may be established on behalf of one or more clients of VCS 830, storage node clusters 851A or 851B may be established at PSS 850, and in-memory database node clusters 861A or 861B may be established at IDS 860. Each of the services 830, 850 and 860 may have an associated data plane master election protocol 832—e.g., protocol 832A at VCS 830, protocol 832B at PSS 850 and protocol 832C at IDS 860. The data plane protocols 832 may differ from one service to another in some embodiments—for example, a ⅔ quorum of nodes may be required in one protocol, and a (50%+1) quorum of nodes may be required in another protocol to elect a replacement master.

In at least one embodiment, an indication of the rules used at each of the data plane protocols may be provided to cluster management service 815; for example, descriptors or specifications of the data plane protocols 832 may be stored in a protocol registry 849. Various recovery manager nodes such as RMNs 844A-844D may be configured within the cluster management service 815 to monitor the states of cluster nodes established in the data planes of the other service s830, 850 and/or 860 in the depicted embodiment. In response to determining that a replacement node cannot be successfully elected at a given cluster (such as a cluster 851, 861 or 840) using the corresponding data plane election protocol after an apparent or actual failure, one or more of the RMNs may use a corresponding control plane election protocol to select a replacement node and notify the affected cluster members accordingly in the depicted embodiment. As such, the cluster management service 815 may offer a general-purpose recovery mechanism for recovering from various types of data plane failures at different services of the provider network in the depicted embodiment. In at least some embodiments, such a cluster management service 815 may store, in a repository such as the protocol registry 849 respective control plane election protocols for the different services monitored, and/or specifications or descriptions of the kinds of configuration state or other information to be monitored with respect to the data plane nodes.

Illustrative Computer System

Figure 9:
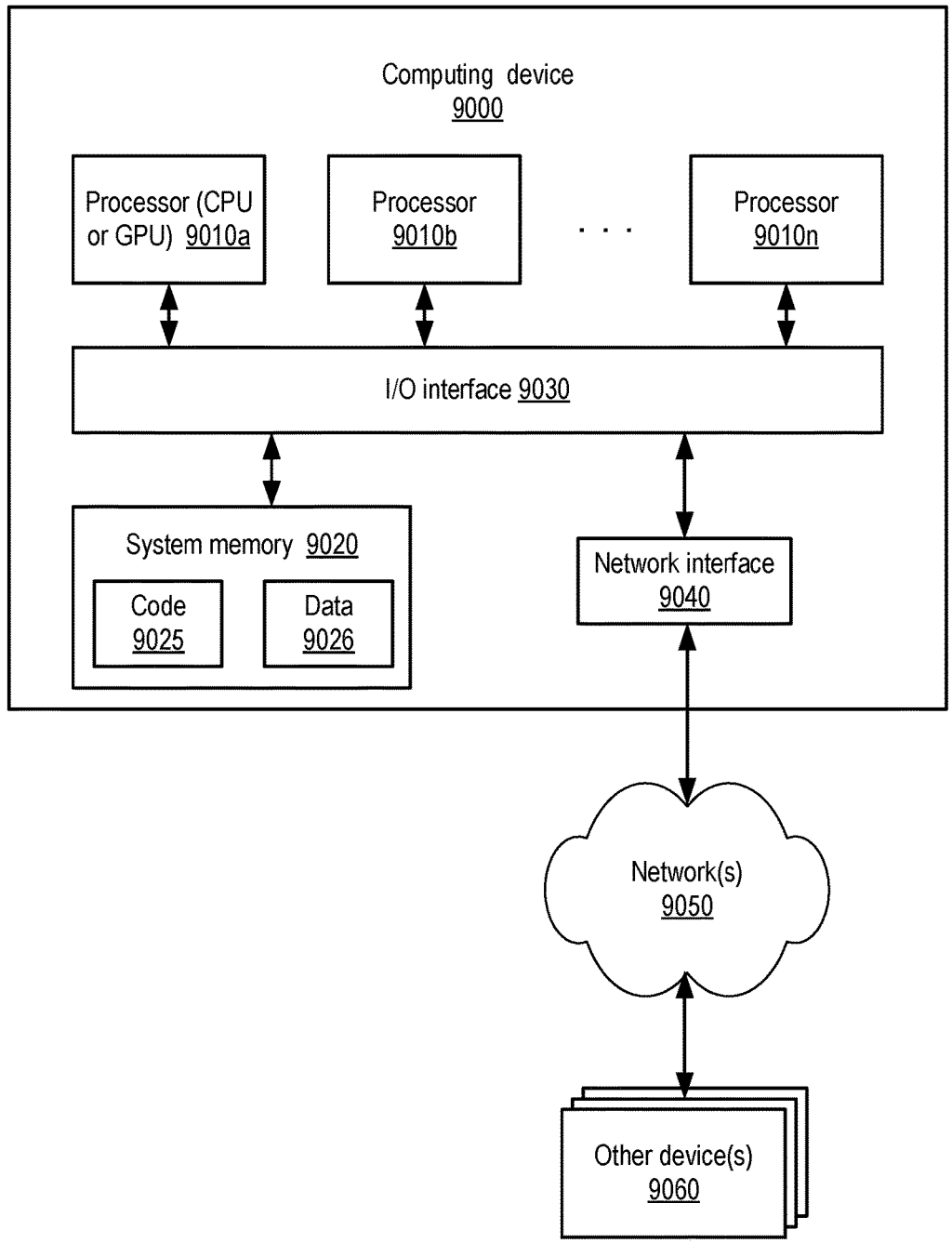
FIG. 9 is a block diagram illustrating an example computing device that may be used in at least some embodiments.

In at least some embodiments, a server that implements one or more of the techniques described above for implementing and recovering clusters, including data plane nodes and control plane nodes such as recovery managers, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors or CPUs.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. In various embodiments, the term "computing device" may refer to one or more of these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   memory storing program instructions that, if executed, cause one or more processors to:
   determine that a replacement master node of a first cluster either cannot be elected by nodes of the first cluster using a first election protocol, or has a probability below a particular threshold of being elected by the nodes of the first cluster using the first election protocol;
   select, responsive to the determination, and based at least in part on an indication of more progress of replication of one or more data items at a first node of the first cluster than at one or more other nodes of the first cluster, the first node as the replacement master node; and
   transmit, by a first recovery manager to at least one node of the first cluster, an indication that the first node has been selected as the replacement master node.

2. The system as recited in claim 1, wherein the first node stores at least a portion of a distributed in-memory database.

3. The system as recited in claim 1, wherein the program instructions, if executed, cause the one or more processors to select the first node as the replacement master node based at least in part on an indication of connectivity of the first node to other nodes of the first cluster.

4. The system as recited in claim 1, wherein the program instructions, if executed, cause the one or more processors to:
   transmit to at least one node of the cluster, a directive indicating that the first node is not to be designated as the replacement master node if the first cluster enters a first state.

5. The system as recited in claim 1, wherein to determine whether a replacement master node of a first cluster can be elected by nodes of the first cluster the program instructions, if executed, cause the one or more processors to:
   obtain, in response to one or more queries, inter-node connectivity status information from at least one node of the first cluster.

6. A method, comprising:
   determining that a replacement master node of a first cluster either cannot be elected by nodes of the first cluster using a first election protocol, or has a probability below a particular threshold of being elected by the nodes of the first cluster using the first election protocol;
   selecting, responsive to the determination, a first node of the first cluster as the replacement master node of the first cluster, wherein said selecting is based at least in part on an indication of more progress of replication of one or more data items at the first node than at one or more other nodes of the first cluster; and
   transmitting, by a first recovery manager to at least one node of the first cluster, an indication that the first node has been selected as the replacement master node.

7. The method as recited in claim 6, wherein the first node stores at least a portion of a distributed in-memory database.

8. The method as recited in claim 6, wherein said selecting the first node as the replacement master node is based at least in part on an indication of a connectivity of the first node to other nodes of the first cluster.

9. The method as recited in claim 6, further comprising:
transmitting, by the first recovery manager to at least one node of the one or more nodes, a directive indicating that the first node is not to be designated as the replacement master node if the first cluster enters a first state.

10. The method as recited in claim 6, wherein said determining whether the replacement master node of the first cluster can be elected by nodes of the first cluster is performed at the first recovery manager, and wherein the method further comprises:
determining, at the first recovery manager, based at least in part on configuration status information pertaining to one or more nodes of a second cluster, whether a replacement master node of the second cluster can be elected by nodes of the second cluster.

11. The method as recited in claim 6, wherein according to the first election protocol, a quorum comprising a plurality of nodes of the first cluster is required to elect a replacement master node.

12. The method as recited in claim 6, further comprising:
receiving, by the first recovery manager, a first response to a first query, wherein the first response comprises an indication of connectivity status pertaining to the first node and at least one other node of the first cluster; and
determining, by the first recovery manager based at least in part on the indication of connectivity status, that a replacement master node of the first cluster cannot be elected by nodes of the first cluster using the first election protocol.

13. The method as recited in claim 12, further comprising:
determining, by the first node based at least in part on a gossip protocol, a connectivity status of the first node with respect to a second node of the first cluster; and
transmitting, by the first node to the first recovery manager, the first response.

14. The method as recited in claim 6, wherein at least one node of the one or more nodes is instantiated at a first resource group of a provider network, wherein the provider network comprises a second resource group, the method further comprising:
obtaining, at the first recovery manager, from a second recovery manager, an indication of connectivity between the second resource group and the at least one node, wherein said determining whether a replacement master node of the first cluster can be elected is based at least in part on the indication of connectivity.

15. The method as recited in claim 6, further comprising:
determining, at the first recovery manager, that a second recovery manager has failed, wherein prior to the failure the second recovery manager was designated to monitor at least a second node of a second cluster; and
designating, by a plurality of recovery managers using a workload distribution protocol, the first recovery manager to monitor the second node.

16. A non-transitory computer-accessible storage medium storing program instructions that when executed on one or more processors cause the one or more processors to perform a method comprising:
determining, based at least in part on one or more queries directed to one or more nodes of a first cluster, that a replacement for a first node of the first cluster either cannot be elected by nodes of the first cluster using a first election protocol, or has a probability below a particular threshold of being elected by the nodes of the first cluster using the first election protocol;
selecting, responsive to the determination, a second node of the one or more nodes as the replacement for the first node, wherein said selecting is based at least in part on an indication of more progress of replication of one or more data items at the second node of the first cluster than at one or more other nodes of the first cluster; and
transmitting, by a first recovery manager to at least one node of the first cluster, an indication that the second node has been selected as the replacement for the first node.

17. The non-transitory computer-accessible storage medium as recited in claim 16, wherein the first node stores at least a portion of a distributed in-memory database.

18. The non-transitory computer-accessible storage medium as recited in claim 16, wherein said selecting the second node as the replacement is based at least in part on an indication of a connectivity of the second node to other nodes of the first cluster.

19. The non-transitory computer-accessible storage medium as recited in claim 16, wherein determining whether the replacement node can be elected comprises determining whether, based at least in part on an expiration of a timeout, the second node has entered a state in which the second node cannot initiate a failover from the first node.

20. The non-transitory computer-accessible storage medium as recited in claim 16, wherein the method further comprises:
determining, at the first recovery manager, based at least in part on one or more queries directed to one or more nodes of a second cluster, whether a replacement for a first node of the second cluster can be elected by one or more other nodes of the second cluster.

* * * * *